United States Patent
Hart

[19]

[11] Patent Number: 5,890,025
[45] Date of Patent: Mar. 30, 1999

[54] FRAME ASSEMBLY FOR SUPPORTING A CAMERA

[75] Inventor: Paul K. Hart, Falls Church, Va.

[73] Assignee: Hart Productions, Inc., Falls Church, Va.

[21] Appl. No.: 867,757

[22] Filed: Jun. 3, 1997

[51] Int. Cl.⁶ .................................................. G03B 17/00
[52] U.S. Cl. .......................... 396/420; 396/421; 396/425
[58] Field of Search ..................................... 396/420–426

[56] References Cited

U.S. PATENT DOCUMENTS

| | | |
|---|---|---|
| 1,971,486 | 8/1934 | Jennings et al. . |
| 2,552,205 | 5/1951 | Moss . |
| 2,636,822 | 4/1953 | Anderson . |
| 2,746,369 | 5/1956 | Beard et al. . |
| 2,806,416 | 9/1957 | Jones, Jr. . |
| 2,873,645 | 2/1959 | Horton . |
| 2,945,428 | 7/1960 | Dearborn . |
| 3,332,593 | 7/1967 | Fauser . |
| 4,206,983 | 6/1980 | Nettman et al. .......................... 396/421 |
| 4,526,308 | 7/1985 | Dovey . |
| 4,963,904 | 10/1990 | Lee . |
| 5,073,788 | 12/1991 | Lingwall . |

*Primary Examiner*—David M. Gray
*Attorney, Agent, or Firm*—Griffin, Butler, Whisenhunt & Szipl, LLP

[57] ABSTRACT

A frame assembly for supporting a portable video or other camera. The assembly comprises a rigid frame, having a front, and a rear. A pair of shoulder rests are connected to the frame and constructed to rest on the shoulders of an operator. A pair of hand grips are connected to the front of the frame. A camera mount is disposed on the front of the frame for releaseably holding the video camera. Lastly, an adjustable counterweight member is connected to the rear of the frame, for balancing the center of gravity of the frame substantially over the shoulders of the wearer, when the camera is held by the mount. The camera mount and counterweight are preferably relatively slideably adjustable to balance the center of gravity of the frame assembly over the shoulders of the operator.

14 Claims, 2 Drawing Sheets

FRAME ASSEMBLY FOR SUPPORTING A CAMERA

I. BACKGROUND OF THE INVENTION

A. Field of the Invention

The present invention relates to a frame assembly for supporting a camera, particularly a portable video or film camera. More particularly, the present invention relates to a frame for stably supporting a portable video camera, or other camera on the shoulders of a user to allow the steady filming, taping or still photography of objects which may be moving rapidly and unpredictably. The frame assembly of the present invention is particularly suited for the recording of aircraft, sporting events, and wildlife.

B. Description of the Related Art

It has heretofore been difficult to stabilize small, portable video and motion picture cameras. Certain uses of these cameras have been particularly difficult such as the recording or filming of moving objects encountered when viewing sporting events, when recording athletes, race cars or aircraft, or when filming or taping wildlife.

Many modern video cameras, for example, have built in electronic or optical stabilizers. These stabilizers are helpful when the camera is held relatively still, to capture, for example, a distant landscape. However, when camera movement is made that exceeds the ability of the built in stabilizer to correct, the result is a jumping effect as the stabilizer attempts to reestablish a reference. This problem is seen particularly often when trying to follow fast, unpredictable objects such as aircraft. Even though the jumping effect is less pronounced when using optical stabilizers as compared to electronic stabilizers, neither stabilizer provides sufficient stability without major additional physical stabilization.

Many products are currently marketed to provide external stabilization for video camera operators. The most common devices are tripods. Tripods offer stability, but even with high cost fluid heads, there are limits to how fast a camera can be panned without roughness in the motion. One tripod head is disclosed in U.S. Pat. No. 1,971,486. It is particularly difficult, using tripods, to continuously follow an aircraft changing elevation and bearing. Known tripods do not have the flexibility to allow the rapid changes in elevation and bearing necessary, and they do not have the freedom of motion to allow for deflection necessary to track aircraft at high elevations. The legs of the tripod are also an impediment to the freedom of motion of the camera operator.

Gyro stabilized platforms are available, but these are extremely expensive, and are usually confined to professional applications. The are heavy, expensive and require considerable power, and are thus inappropriate for hobby video or film work.

One device, presently sold by Glidecam Industries of Plymouth, Mass., uses a system of weights and balances to stabilize a handheld video camera. However, use of this device requires the suspension of a considerable amount of weight in front of the camera operator, and thus causes significant fatigue in the operator. In addition, the camera operator cannot use the camera's view finder, but must look directly at the object. This method of stabilization severely limits the option to move the camera to track moving objects. Recent variations of this product provide a post that nests in a pocket on the camera operator's belt. This belt assembly could support a considerable amount of weight, and might otherwise be useful, but still does not provide sufficient stability for all uses and requires that the operator's hands be on the camera at all times.

Another device, called a Camcorder Shoulder Rest, is sold by Video Innovators, of Frisco, Colo. This device is a hand-held mounting bar on which a camera is mounted. At the end of the device in front of the camera operator is a handle pointing downward, which the camera operator grips to stabilize the camera and support most of its weight. At the shoulder, the rest is curved and padded in order to rest comfortably on the camera operator's shoulder. In spite of claims to the contrary, when a camera is mounted on one of the rests, it is not positioned so that the camera operator can comfortably look into the viewfinder. While shifting some of the camera's weight to the operator's shoulder may be of assistance, the entire unit is unstable to tilting, i.e., the camera can be easily tilted causing extreme instability in the resulting video footage.

A portable camera assembly having a shoulder rest, a hand grip and a camera mount is also disclosed in U.S. Pat. No. 4,963,904 to Lee. A gun stock camera rest, is disclosed in U.S. Pat. No. 2,806,416 to Jones. A support for photographic cameras with shoulder straps, a belt and various support and cross bars is disclosed in U.S. Pat. No. 2,552,205 to Moss. However, these devices all have the disadvantages of the Camcorder Shoulder Rest, discussed above.

Monopods have also been used in the past, and can provide some stability when grasped about 12" below the body of the camera. One such monopod is disclosed in the Jones patent, cited above. Nonetheless, the stability obtained with monopods is still not acceptable.

Various other types of shoulder harnesses for supporting cameras have been proposed in the prior art, but none provide a stable, inexpensive and versatile solution to supporting a portable video camera. For example, U.S. Pat. No. 2,746,369 to Beard et al., discloses a shoulder camera mount with pistol grips for supporting telephoto and long focus lenses. The patent discloses, for example, that the weight of the "camera gun" is so distributed that the center of gravity thereof at elevated positions is substantially disposed to fall along a line through the shoulders and torso of the operator. However, it is clear that at normal elevations, or at angles below the horizontal, a great deal of the weight of a telephoto lens for example, would be placed in the hands of a user, causing eventual fatigue. No means for adjusting the center of gravity of the assembly, for example, is provided.

A camera support is disclosed in U.S. Pat. No. 3,332,593 to Fauser, in which "body-engaging tubular members" and "body-engaging" rollers attach the support to the body. Similar shoulder harness supports are disclosed in U.S. Pat. No. 5,073,788 to Lingwall, U.S. Pat. No. 4,526,308 to Dovey, U.S. Pat. No. 2,873,645 to Horton, and U.S. Pat. No. 2,636,822 to Anderson. These devices have, among others, the disadvantage of being unable to move independently of the body of the operator.

U.S. Pat. No. 2,945,428 to Dearborn discloses a camera stabilizer with a tubular frame, a camera mounting portion and balancing masses disposed on opposite sides of the apparatus. However, the frame is specifically intended not to be rested on the shoulders of the operator. The entire weight is supported by the users arms, or, in other disclosed embodiments, a combination of the users arms and a monopod or belt harness, so that use of this device would lead to unnecessary fatigue.

It is therefore an object of the present invention to provide a frame for stably supporting a portable video camera which is inexpensive, relatively light, and easy to use. It is a further object of the present invention to provide a frame for a video camera which is extremely stable and maneuverable, and which does not cause fatigue in the operator.

Another object of the present invention is to provide a frame for mounting a video or other type of camera which is extremely stable and maneuverable, and transfers the weight of the camera and associated mounting hardware to the operator's shoulders. This transfer removes the need for the operator to exert any force on the controlling handles that would otherwise be required to support the camera. Accordingly, the only forces necessary for the operator to apply are those required to move the camera and its hardware mounting assembly in azimuth and elevation to follow moving objects. Much of the azimuth change necessary is provided by moving the operator's trunk, or twisting the torso. Greater azimuth movements can be obtained by changing the position of the operator's feet. The result is that the camera securely rests on a stable platform, the operator's shoulders, and the operator can move the assembly with forces that are greatly reduced compared to those required if weight-support forces were superimposed on the forces necessary to move the camera. The fact that the operator is not providing any weight support with the hands and arms greatly reduces fatigue. The result is that the operator is able to obtain much higher quality images with greatly reduced spurious motion, and can operate the camera for extended periods without degradation of the quality of the images that would result from fatigue.

II. SUMMARY OF THE INVENTION

In accordance with the above objects, the present invention provides a frame assembly for supporting a portable video camera, or other camera. The assembly comprises a rigid frame, having a front, and a rear. A pair of shoulder rests are connected to the frame and constructed to rest on the shoulders of an operator. A pair of hand grips are connected to the front of the frame. A camera mount is disposed on the front of the frame for releaseably holding the video camera. Lastly, an adjustable counterweight member is connected to the rear of the frame, for balancing the center of gravity of the frame substantially over the shoulders of the wearer, when the camera is held by the mount.

In another embodiment, the shoulder rests are constructed to pivot on the shoulders of the operator.

In a still further embodiment, the counterweight is releasably attached to the frame.

In yet another embodiment, the frame comprises a front half, and a rear half slideably adjustable relative to the front half of the frame and the shoulder supports. In one embodiment, a cross strut is connected to the front of the frame for supporting the camera mount on the frame. This cross strut is slideably adjustable relative to the front half of the frame.

The camera mount is preferably removable so that a wide variety of cameras can be used with the frame assembly of the present invention. The camera mount is preferably pivotable, so as to pivot a camera fitted on the mount. In this way the tilt, pitch and yaw of a camera mounted on the frame of the present invention can be adjusted.

In one embodiment, one of the hand grips comprises a control connectable to and for controlling operation of the video camera. In still further embodiments one or more of the hand grips is slideably adjustable relative to the front of the frame.

In yet another embodiment a pivot joint is provided connecting each shoulder support to the frame, so that the frame is pivotable relative to the shoulder supports. In this embodiment one or more cross struts connect the shoulder supports.

Further objects, features and advantages of the present invention will become apparent from the Detailed Description of the preferred embodiments, when considered together with the attached drawings.

III. BRIEF DESCRIPTION OF THE DRAWINGS

IV. DETAILED DESCRIPTION OF THE PREFERRED EMBODIMENTS

Figure 1:
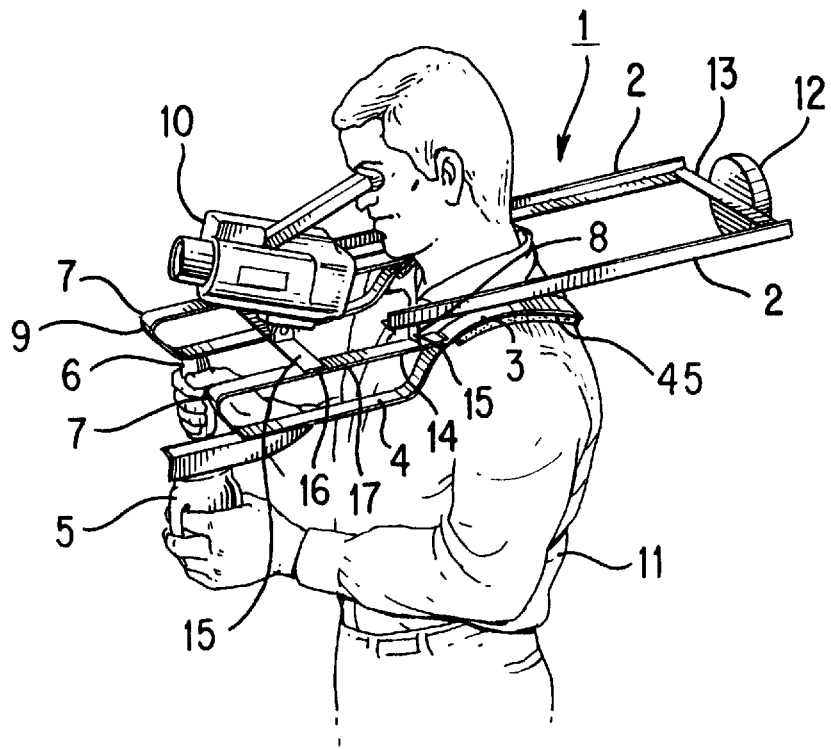
FIG. 1 is a perspective view of the frame assembly of the present invention as used by an operator.

The preferred embodiments of the present invention will now be described in more detail with reference to the drawings in which like parts are given like reference numerals.

FIG. 1 is a perspective view of the frame assembly 1 according to the present invention as used by an operator 11. The frame assembly comprises a rear portion made of two side rails 2, connected by a cross strut 13. One of skill in the art will recognize that the rails 2 and strut 13 can be joined by welding, bolting or any other appropriate means. It is even possible that rails 2 and strut 13 are made of a single piece of material. It is proposed that the present assembly be made of metallic angle bar, but any other appropriate, rigid, easily fabricated material such as metal of round or square cross section or plastic can also be used.

Rails 2 are slideably connected to upper frame portion 7 by a bolt and slot mechanism in which bolts 15 connected to rails 2 are slideably disposed in slots 14 cut out of upper frame portion 7. A similar mechanism (not shown) slideably connects rails 2 with shoulder rests 3. Bolts 15 can be fixed at a desired position in slots 14 by any appropriate means such as washers and wing nuts (not shown). One of skill in the art will recognize that many other means of sliding adjustment, such as, for example a telescoping adjustment may also be used in the present invention.

The frame assembly 1 also comprises a front portion comprising two upper frame portions 7 bent upward from a front end of lower frame portions 4, and backward until they abut shoulder rests 3. Each lower frame portion 4 in this embodiment is thus made as a unitary piece with shoulder rest 3, and upper frame portion 7. In this embodiment, the shoulder rests 3 are a shallow curved portion formed at the rear of each lower frame portion 4 and shaped to be comfortably rested on the shoulders of operator 11. The shallow shape of shoulder rest 3 allows it to be easily tilted to any desired angle by the operator 11. The lower surface of shoulder rest 3 is typically fitted with appropriate foam or padding material 45. A rear straight end of each upper frame portion 7 is bent backward until it abuts the shoulder rest 3. Upper frame portion 7 may be attached to shoulder rest 3 by suitable means such as welding.

In addition to slots 14, each upper frame portion 7 has slots 17 for slideably attaching a cross strut 15 having bolts 16. As with bolts 15, bolts 16 can be fixed at a desired position of slots 17 by any desired means such as washers and wing nuts, for example. A camera mount 9 is disposed toward the center of strut 15 on the upper side of the strut. Mount 9 is a pivotable mount for holding camera 10 to the frame assembly 1 and allowing the camera 10 to be pivoted in any desired angle with respect to the frame assembly 1. For example, the tilt, pitch and yaw of the camera 10, can all be adjusted. Camera mount 9 is also preferably removable, so that special mounts adapted to different cameras can be interchanged at will.

Hand grips 5,6 are provided attached to each lower frame portion 4. In the embodiment of FIG. 1, the left hand grip 5 is a pistol grip type control unit for controlling the functions of the camera. Right grip 6, is a simple hand grip without control functions. One of skill in the art will understand that, alternatively, the right grip 6 could be a control grip, both grips could have some control functions, or neither grip could have controls. One of skill in the art will also realize that the grips 5,6 could be adjustable in any number of ways. For example, grips 5,6 could be slideably adjustable with a slot and bolt means such as shown with the adjustment of strut 15 and rails 2. In addition, the grips could be made to pivot and twist into any desired position.

The use of frame assembly 1 according to the present invention will now be described with reference to FIGS. 2 and 3. First, camera 10 is mounted on camera mount 9 at a desired angle so that the eyepiece of the camera can be conveniently viewed by operator 11. If necessary, strut 15 can also be adjusted so that the camera is in a convenient position. Next, the position of the rear portion of frame assembly 1 comprising rails 2, strut 13, and counterweight member 12 is adjusted relative to the front portion of frame assembly 1 by means of the mechanism of slots 14 and bolts 15. The rear portion of frame assembly 1 is positioned so that the center of gravity of the entire frame assembly 1 and attached camera 10 is above the shoulders of operator 11 at the shoulder rests 3. In this manner, the operator 11 is not fatigued by having to support the weight of the frame assembly 1 with his hands. The hand grips 5,6 are thus used merely to guide the camera, and the assembly 1 rests stably on the shoulders of operator 11. If cameras of widely differing weight are interchangably used with the frame assembly 1, then it may be desirable to interchange counterweights 12 as well. In this manner the slot and bolt mechanism or similar sliding adjustment can be used for more delicate adjustments, while interchange of counterweights is used for rough, or more substantial adjustment.

Figure 2:
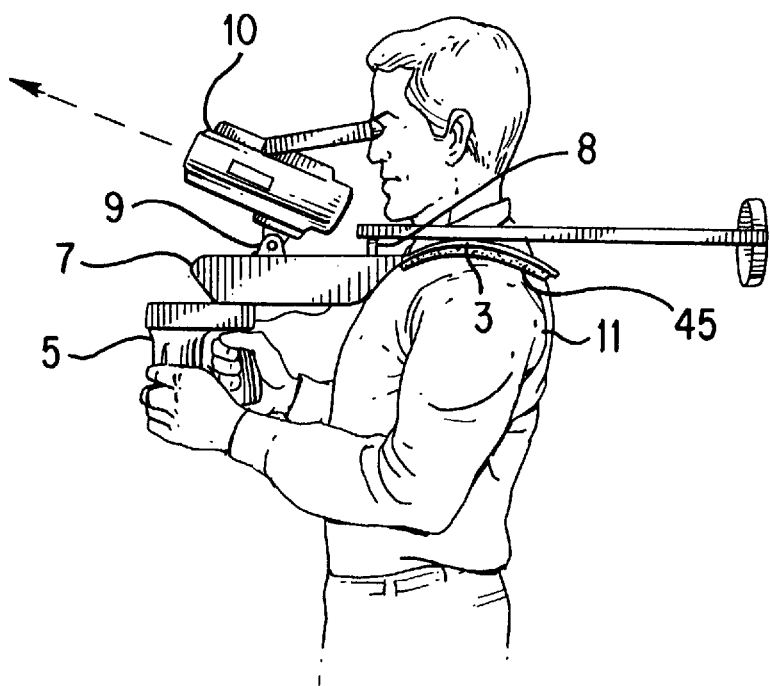
FIG. 2 is a side view of the frame assembly of the present invention when used to view an object above the horizontal.

In FIG. 2, the camera 10 is shown to be directed at an object above the horizontal. If the operator 11 desires to direct the camera to a different object, very little effort is required, because, after adjustment, the weight of the assembly 1 rests substantially on the shoulders of operator 11.

Figure 3:
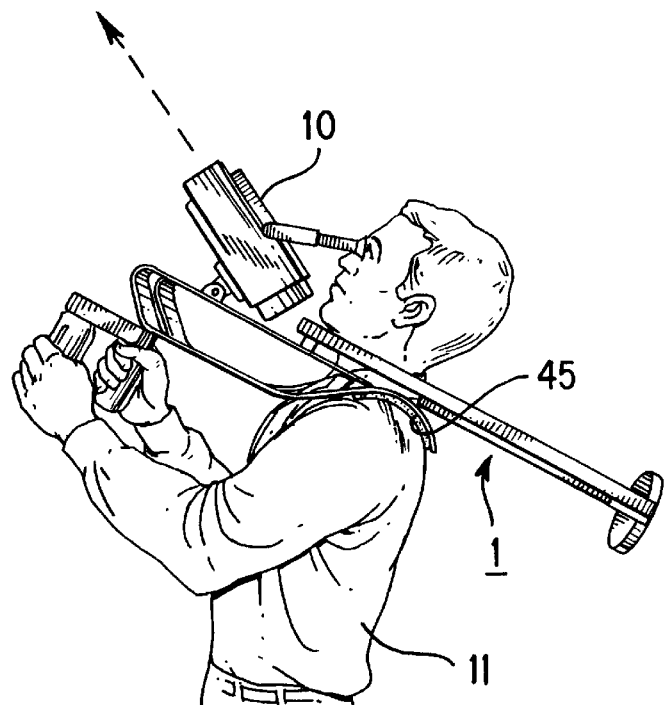
FIG. 3 is another side view of the frame assembly of the present invention tilted on the operator's shoulders toward the vertical with respect to FIG. 2.

FIG. 3 shows the assembly 1 pitched upward to point at an object closer to the vertical than in FIG. 2. Because the weight of the assembly is balanced on both shoulders of the operator 11, the movement between the position shown in FIG. 2 and the position shown in FIG. 3 can be made smoothly. In addition, because the assembly is grasped by both hands of operator 11, twisting movements from side to side (yaw) can also be made quite stably.

Figure 4:
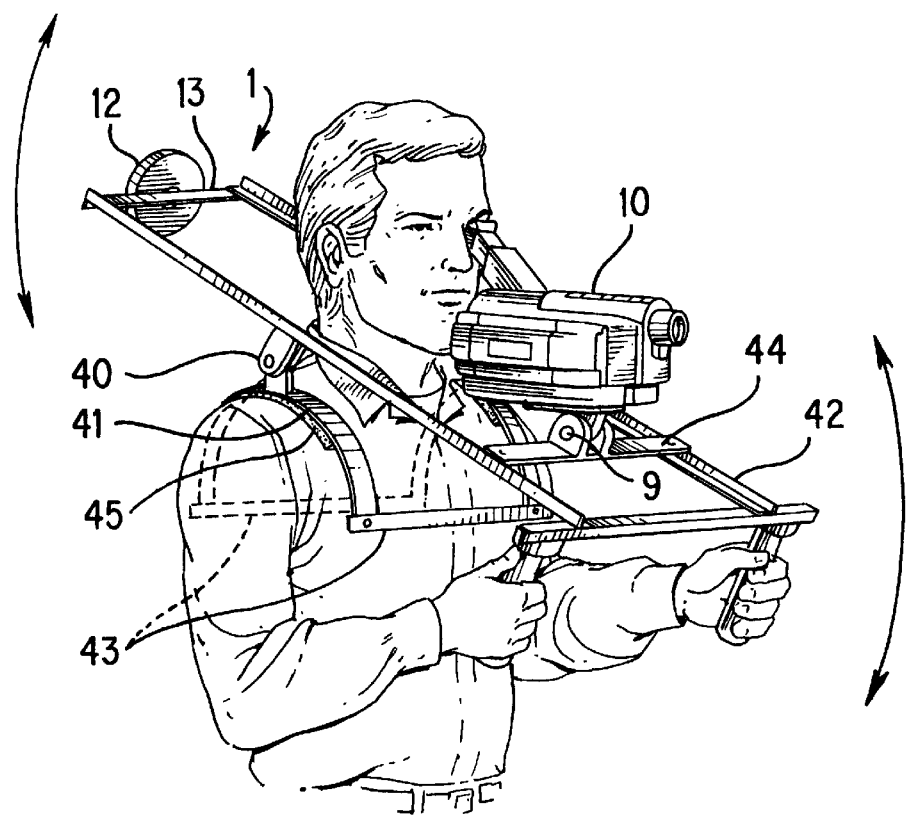
FIG. 4 is a perspective view of another embodiment of the present invention in which the frame pivots on the shoulder rests.

FIG. 4 is a perspective view showing an embodiment of the present invention in which pivot joints 40 are provided to allow frame 42 to pivot with respect to shoulder rests 41. In this embodiment, shoulder rests 41 are connected in the front and back by struts 43 to increase stability. Strut 44, which supports camera mount 9 and thus camera 10 is slideably adjustable with respect to frame 42. The balance of assembly 1 can be adjusted in the same manner as the embodiment of FIGS. 1–3. Specifically, weight 12 can be interchanged for rough adjustments, and the rear portion of frame 42 can be slideably adjusted relative to the front portion of frame 42. Such sliding adjustment can be accomplished in any number of ways, including the slot and bolt mechanism of FIG. 1, a telescoping mechanism (not shown) in which a rear portion of frame 42 telescopes inside of a front portion of frame 42.

While the present invention has been illustrated by means of several preferred embodiments, one of ordinary skill in the art will recognize that additions, deletions, substitutions and improvements can be made while remaining within the spirit and scope of the appended claims.

Specifically, while the preferred embodiments as shown in the drawings have been described as used with portable video cameras, the invention applies equally to motion picture cameras, still cameras, and others. The embodiments describe the exchanging of cameras on mount 9, and one of skill in the art will recognize that various types and designs of cameras are accommodated and intended by the frame assembly of the present invention.

The invention is useful with many types of camera, especially cameras with high magnification lenses. Many cameras have the same sort of problems, if, for example, used to take shots of an aircraft in flight. Any type of camera mounted on the frame assembly according to the present invention will provide the operator with the capability to pan more accurately with a moving object and obtain clear photos with greater magnification than would otherwise be possible.

Also, while the invention calls for a "rigid" frame, collapsible and easily stowed and disassembled frames are contemplated within the scope of the invention.

What is claimed is:

1. A frame assembly for supporting a camera, comprising:
   a rigid frame, having a front, and a rear;
   a pair of padded shoulder rests connected to the frame and constructed to lie on the shoulders of an operator and transfer substantially all of the weight of the frame to shoulders of the operator;
   a pair of hand grips connected to the front of the frame;
   a camera mount disposed on the front of the frame for releaseably holding the video camera; and
   an adjustable counterweight member connected to the rear of the frame, for balancing a center of gravity of the frame substantially over the shoulders of the wearer, when the camera is held by the mount.

2. A frame according to claim 1, wherein the shoulder rests are constructed to pivot on the shoulders of the operator.

3. A frame according to claim 1, wherein the counterweight member comprises a counterweight, and an attachment member for releaseably attaching the counterweight to the frame.

4. A frame according to claim 3, wherein the frame comprises a front portion, and a rear portion slideably adjustable relative to the front portion of the frame and the shoulder supports.

5. A frame according to claim 4, further comprising a cross strut connected to the front portion of the frame for supporting the camera mount on the frame.

6. A frame according to claim 4, wherein said cross strut is slideably adjustable relative to the front portion of the frame.

7. A frame according to claim 1, wherein said camera mount is removable.

8. A frame according to claim 1, wherein said camera mount is pivotable, so as to pivot a camera mounted on the mount.

9. A frame according to claim 8, wherein said camera mount is pivotable to adjust the tilt, pitch and yaw of a camera mounted on the mount.

10. A frame according to claim 1, wherein one of said hand grips comprises a control connectable to and for controlling operation of said camera.

11. A frame according to claim 1, wherein one or more of said hand grips is slideably adjustable relative to the front of the frame.

12. A frame according to claim 1, further comprising a pivot joint connecting each shoulder support to the frame, so that the frame is pivotable relative to shoulder supports.

13. A frame according to claim 12, further comprising a cross strut connecting the shoulder supports.

14. A frame according to claim 13, wherein each shoulder support has a front and a rear portion, and further comprising a first cross strut connecting the front portions of shoulder supports, and a second cross strut connecting the rear portions of the shoulder supports.

* * * * *